United States Patent [19]

Matsumaru

[11] Patent Number: 5,661,966
[45] Date of Patent: Sep. 2, 1997

[54] STEEL CORD FOR REINFORCEMENT OF OFF-ROAD TIRE, METHOD OF MANUFACTURING THE SAME, AND OFF-ROAD TIRE

[75] Inventor: Kazuo Matsumaru, Dejima-mura, Japan

[73] Assignee: Tokyo Rope Manufacturing Co. Ltd., Tokyo, Japan

[21] Appl. No.: 671,529

[22] Filed: Jun. 27, 1996

[51] Int. Cl.$^6$ .................................................. D02G 3/02
[52] U.S. Cl. ........................... 57/902; 57/206; 57/212; 57/213; 57/236; 57/237
[58] Field of Search ................... 57/206, 236, 237, 57/902, 311, 212, 213, 216

[56] References Cited

U.S. PATENT DOCUMENTS

| | | | |
|---|---|---|---|
| 5,287,691 | 2/1994 | Okamoto et al. | 57/236 |
| 5,319,915 | 6/1994 | Kobayashi et al. | 57/311 |
| 5,321,941 | 6/1994 | Bollen et al. | 57/213 |
| 5,337,549 | 8/1994 | Kobayashi et al. | 57/236 |
| 5,502,960 | 4/1996 | Kobayashi et al. | 57/236 |

FOREIGN PATENT DOCUMENTS 5-272081  10/1993  Japan ........................... 57/238

*Primary Examiner*—William Stryjewski
*Attorney, Agent, or Firm*—Michael J. Striker

[57] ABSTRACT

A steel cord effective for reinforcing a super-large off-road tire wherein strands made by simultaneously twisting together 3 to 6 steel wires in the same twisting direction with the same pitch length are used and the steel cord is made by twisting together 3 to 6 such strands in the same direction as the twisting direction of the strands and with the same pitch length. Each of the steel wires constituting the strands continuously has a small wavy pattern of a pitch length smaller than the lay length of the strands and therefore each of the strands has a compound pattern comprising a wavy pattern formed by the twisting and said small wavy pattern and in a gap is formed between steel wires each of the strands by the small wavy pattern. The lay length $P_1$ of the steel cord is 8 to 15 times the steel cord diameter D and the elongation on breakage by tension of the steel cord is over 5%.

4 Claims, 4 Drawing Sheets

Fig. 1-A
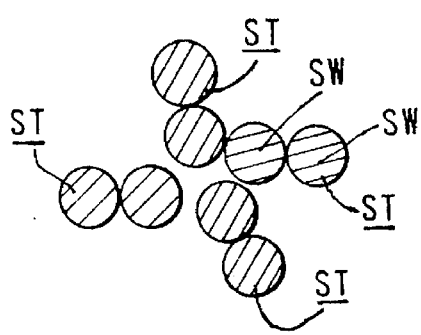
PRIOR ART
Fig. 1-B
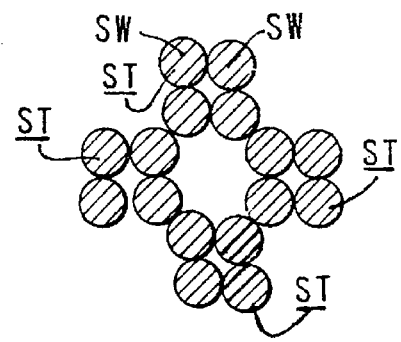
PRIOR ART
Fig. 2-A
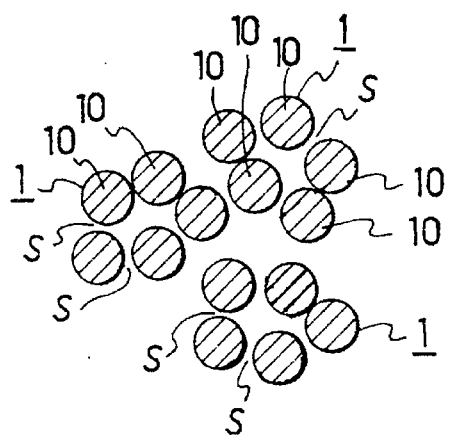
Fig. 2-B
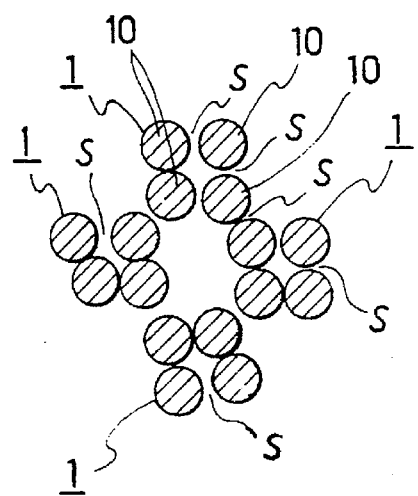

Fig. 4-A
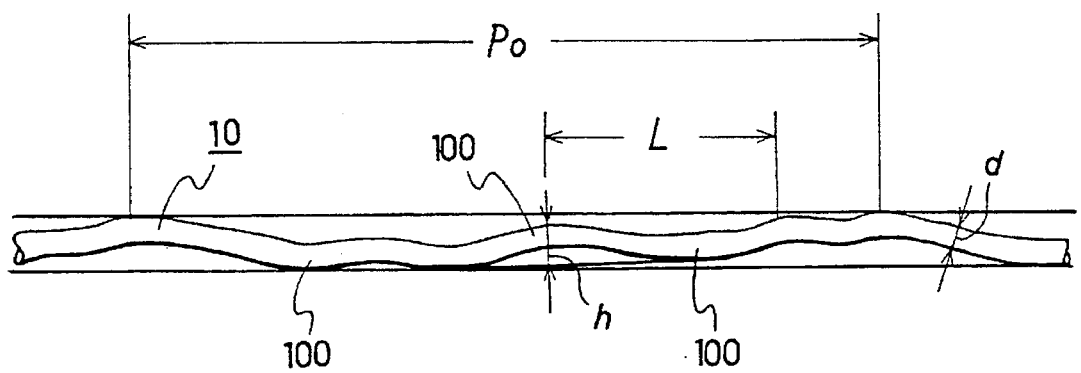
Fig. 4-B
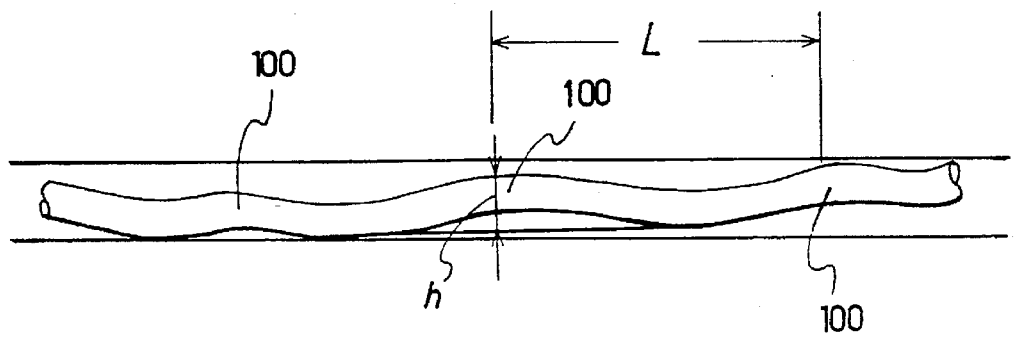

Fig. 6-A
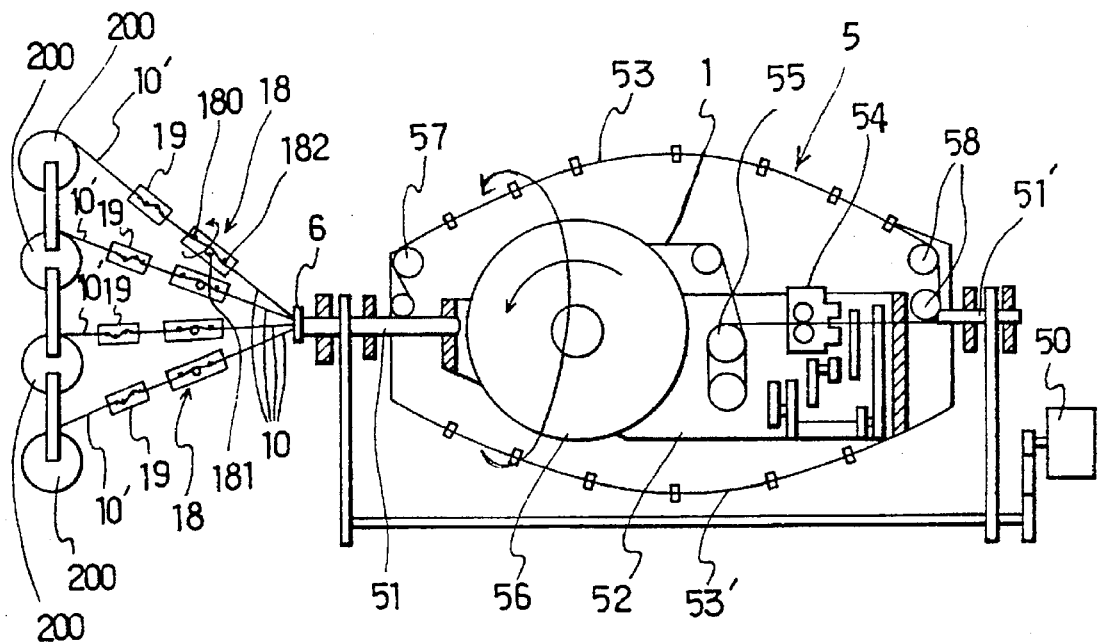
Fig. 6-B
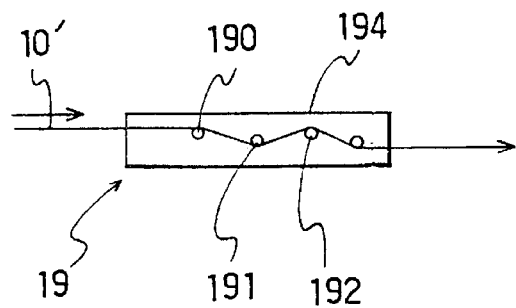

STEEL CORD FOR REINFORCEMENT OF OFF-ROAD TIRE, METHOD OF MANUFACTURING THE SAME, AND OFF-ROAD TIRE

BACKGROUND OF THE INVENTION

The present invention relates to a steel cord used for rubber product reinforcement, method of manufacturing the same, and a tire using the steel cord, and particularly to a steel cord effective for reinforcing a super-large off-road tire and an off-road tire using this.

In large-scale construction work such as dam construction, housing/road development and mining development, various operations such as excavating, cutting and leveling ground and carrying produced earth, sand and rock are indispensable. As means for carrying out these operations, motor graders, earth graders, earth movers, scrapers, shovel loaders, mobile hammers, power shovels, tire milers, load sweepers, dumper cars and mobile cranes and the like are used.

The vehicle constructions of these kinds (including cargo handling construction vehicles) are made larger and heavier in order to promote increased efficiency of the operations such as excavating and carrying for which they are used. In this connection the tires which support the loads of these machines also become larger, and super-large tires With a diameter over 4 m and the weight over 5 tons have come into use. These super-large off-mad tires, unlike tires for vehicles such as trucks which travel on road surfaces, travel on off-road surfaces where rocks and the like are exposed while supporting large loads exceeding 50 tons. Furthermore, the operation of replacing these tires is not easy. Consequently, it is required of these tires that they have good durability and as long a life as possible. To achieve this, the steel cord embedded in the rubber as a rubber reinforcing material must be a suitable one. In particular, because belt layers near the tread, and especially the outermost belt layer, are near the surfaces making contact with the ground, various stress fluctuations suffered during travel are large and they are subjected to impact type stresses when passing over projections such as rocks and the like. Because as a result the steel cords readily break, this has a large affect on the tire life. Therefore, steel cords used for reinforcing super-large off-road tires, and particularly those of belt layers near the tread, in addition to having good strength preferably have characteristics of pliability and large elongation (high ductility characteristic of a large elongation on breakage by tension) so that they can absorb impact type stresses.

For steel cords for belts of conventional super-large off-road tires, generally a (7×7)+1 structure wherein seven strands each made by twisting together seven steel wires are twisted together and one steel wire is wound around this in a helix has been used. However, with this kind of steel cord structure there has been the problem that the life of the steel cord is short because its elongation is low and it breaks easily.

As a countermeasure to this, the application of steel cord structures tried in steel cords of tires for trucks and buses, that is, 4×2 structures and 4×4 structures made by twisting together four stands ST each made by twisting together two or four steel wires SW, as shown in FIG. 1-A and FIG. 1-B, to super-large off-road tires has been thought of and in some cases actually used. However, in these steel cords, to obtain high ductility the lay lengths of the strands and the steel cord are made extremely short. For example, in a steel cord of 4×4 structure made up of steel wires whose diameter is 0.22 mm, the cord lay length has been short at about five times the cord outer diameter and the strand lay length has been short at about ½ the cord lay length. In this steel cord, the number of twists per unit length of cord is high and consequently the manufacturing cost is very high because the twisting efficiency is poor. Also there has been the shortcoming that because a decrease in strength caused by twisting loss is also large (the strength of the steel wires is not used efficiently) it is difficult to obtain a steel cord of high strength. Furthermore, because the breaking load of this type of cord currently in use is less than 1568N, it is necessary to make the number of cords embedded in reinforcing layers large and consequently there is the shortcoming that the tire weight increases.

For these reasons it has been possible to carry out satisfactory improvement by applying steel cords of tires for trucks and buses and steel cords of super-large off-road tires.

SUMMARY OF THE INVENTION

Accordingly, it is an object of the present invention, to provide a steel cord for an off-road tire of which the elongation on breakage by tension is very large, which has high strength and which can be manufactured at low cost.

It is another object of the invention is to provide a super-large off-road tire having a long life.

In the invention, off-road tire includes tires for motor graders and earth graders, earth movers, scrapers, shovel loaders, mobile hammers, power shovels, tire rollers, load sweepers, dumper cars and mobile cranes and the like.

To achieve the above-mentioned first object, the invention has strands each made by simultaneously twisting together 3 to 6 steel wires in the same twisting direction and with the same pitch length, each of the steel wires constituting the strands continuously has a small wavy pattern of a pitch length smaller than the lay length of the strands and therefore each of the strands has a compound pattern comprising a wavy pattern formed by the twisting and said small wavy pattern and gaps are formed between the steel wires by the small wavy pattern.

Three to six of the strands are simultaneously twisted together in the same direction as the strand twisting direction and with the same pitch length to constitute the steel cord, and the lay length $P_1$ of the steel cord is 8 to 15 times the steel cord diameter D and the elongation on breakage by tension of the steel cord is over 5%.

The pitch length L of the small wavy pattern of the steel wires constituting the strands in its relation ($L/P_0$) to the lay length $P_0$ of the strands is preferably in the range 0.25 to 0.55. The height h of the small wavy pattern of the steel wires in its relation (h/d) with the steel wire diameter d is preferably 1.05 to 2.00.

Preferably, the breaking load of the cord is over 1568N. To achieve the above-mentioned second object, a steel cord of the construction described above is used in at least the outermost belt reinforcing layer (belt layer) of an off-road tire.

A steel cord according to the invention basically uses strands made by simultaneously twisting together three to six wires in the same direction and with the same twisting pitch. Three to six of these strands are simultaneously twisted together in the same direction as the twisting direction of the strands and with the same pitch length. As a result, compared to a case wherein the twisting direction of the cord and the twisting direction of the strands are opposite, it is possible to make the elongation large.

Furthermore, the steel wires are given a small wavy pattern before being twisted together, and the pitch length of this small wavy pattern is shorter than the lay length of the strands. As a result, each of the strands has a special form wherein a wavy pattern formed by the twisting of the strand and a small wavy pattern of a short pitch length different from that of this wavy pattern are compounded. For this reason, with respect to elongation, because an individual elongation due to the small wavy pattern is added to the elongation due to the wavy pattern formed by twisting, the elongation on breakage by tension of the strands and the cord made by twisting these together is over 5%. Therefore, it is possible to realize a high elongation without making the twisting pitch of the cord short and it is thereby possible to increase the resistance to cutting.

Also, because the steel wires constituting the strands have a wavy pattern of a pitch length shorter than the lay length of the strands and the lay length of the cord, while the cross-sectional shape of the steel cord has a compact form, gaps are formed between the steel wires. As a result, in a vulcanizing process following tire molding, rubber penetrates well into the inside of the strands and functioning of the tire as a composite can be well obtained.

Furthermore, because the cross-sectional shape of the steel cord has a compact form, the gaps are stable even during topping, and leaning of the steel wires does not readily occur. Also, because even when axial direction compressive forces act on the steel cord it does not readily deform into the shape of a bird cage and excessively large spaces like those of loosely twisted strands are not formed, even when an exterior cut penetrates the tread outside matter does not readily pierce through the cords.

In particular, concerning the small wavy pattern of the steel wires, when the pitch length L in its relation with the strand lay length $P_0$ is made $0.25 \leq L/P_0 \leq 0.55$ and the small wave height in its relation with the steel wire diameter d is made $1.05 \leq h/d \leq 2.00$ good elongation can be realized without decreasing strength. When the lay length $P_1$ of the cord is made such that its relation ($P_1/D$) with the cord diameter D is 8 to 15, it is possible to achieve a characteristic of over 5% elongation on breaking while keeping twisting loss low.

Because the breaking load of the cord is over 1568N, it is possible reduce the number of cords embedded in the reinforcing layers of a super-large tire and by this means it is possible to reduce the weight of the tire and make it more economical. Also, because the twisting pitch of the strands and the twisting pitch of the steel cord are both long, strength reduction due to twisting is low and it is possible to make a steel cord which is both high-strength and low-cost.

When a steel cord of the invention is used in a belt reinforcing layer of a super-large off-road tire, and particularly in a reinforcing layer near the tread, because its high-ductility characteristic is excellent, the rubber penetration is good and corrosion resistance is also good, it is possible to make the tire life long.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1-A is an enlarged sectional view showing a conventional steel cord for a truck or a bus;

FIG. 1-B is an enlarged sectional view showing another conventional steel cord for a truck or a bus;

FIG. 2-A is an enlarged sectional view showing a first example of a steel cord according to the invention;

FIG. 2-B is an enlarged sectional view showing a second example of a steel cord according to the invention;

FIG. 4-A is a partial enlarged side view of a single filament removed from the strand shown in FIG. 3;

FIG. 4-B is a further enlarged side view of FIG. 4-A;

FIG. 6-A is a schematic side view showing an example of a method and an apparatus for manufacturing a strand of the invention; and FIG. 6-B is an enlarged view of a performing device in FIG. 6-A.

DESCRIPTION OF PREFERRED EMBODIMENTS

A first example of a high-ductility steel cord to which the invention has been applied and wherein a 3×5 structure has been employed is shown in FIG. 2-A. FIG. 2-B shows a second example having a 4×4 structure. In FIG. 2-A and FIG. 2-B, strands 1 are made up of steel wires 10. In FIG. 2-A each strand 1 is made up of five steel wires 10 and in FIG. 2-B each strand 1 is made up of four steel wires 10.

The steel wires 10, or steel filaments, have a diameter of about 0.20 to 0.60 mm, and are coated with a coating having good adherence to rubber such as brass plating. The steel wires 10 constituting the strands 1 are preformed before being twisted together, and a small wavy pattern 100 having a predetermined pitch length L and a height h of the kind shown in FIG. 4-A and FIG. 4-B is continuously repeated.

Figure 3:
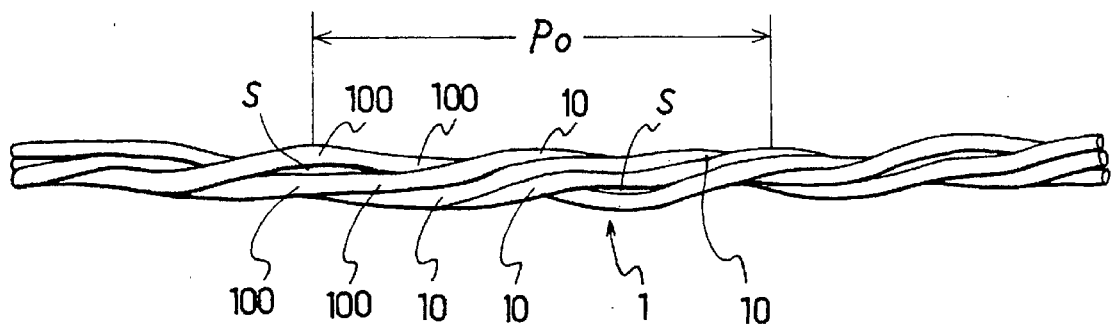
FIG. 3 is an enlarged sectional view of a strand in the invention.

A predetermined number of steel wires 10 thus given the small wavy pattern 100 are simultaneously twisted together in the same twisting direction with the same lay length to form a strand 1 like that shown in FIG. 3. Then, steel cords are made by three in FIG. 2-A and four in FIG. 2-B of these strands 1 being simultaneously twisted together in the same twisting direction and with the same lay length. The lay length $P_1$ of the steel cords in the first example and the second example is preferably such that when the outer diameter of the cord is written D, $P_1/D$ is 8 to 15, and from the manufacturing cost point of view the lay length $P_0$ of the strand 1 is preferably about 40% to 70% of the cord lay length $P_1$.

Among the steel wires 10 constituting the strands 1, as is clear from FIG. 2-A and FIG. 2-B, at least one adjacent pair are in a non-contacting state, and this cross-sectional shape appears at any position along the entire length of the steel cord.

In the steel cord of FIG. 2-A, the cross-sectional shape of each of the strands 1 is that of a collapsed pentagon, and between the steel wires at one or more locations is formed a gap s resulting from the small wavy pattern 100. In the steel cord of FIG. 2-B, the cross-sectional shape of each of the strands 1 is that of a collapsed square and again at one or more locations is formed a gap s resulting from the small wavy pattern 100. These gaps s constitute passages through which rubber can penetrate.

Explaining the invention in more detail, the strands 1 of the first example and the second example have a high ductility such that their elongation on breaking by tension is over 5%. This is necessary to absorb impact stresses acting for example when a tire rolls over a foreign objects and increase the resistance to cutting.

An aim of the invention is to achieve this high ductility characteristic without making the twisting pitch of the strands or the steel cord short (and consequently reducing strength) and also at the same time provide good rubber penetration.

As means for doing this, the steel wires 10 constituting the strands 1 are given the small wavy pattern 100 in advance. The shape of this small wavy pattern 100 is normally helical. When a predetermined number of these steel wires 10 are twisted together to form a strand 1, the steel wires 10 are given a helical shape resulting from the twisting. Consequently, each of the steel wires 10 is given two compounded helical shapes respectively resulting from the small wavy pattern 100 and the strand twisting. Therefore, it is possible to twist-in the steel wires to a greater degree of twist-in than planned.

FIG. 4-A and FIG. 4-B show the shape of one steel wire 10 removed from a twisted strand 1. To make the elongation on breaking of the cord over 5%, in FIG. 4-A, when the pitch length is written L and the strand lay length is written $P_0$, a degree of the small wavy pattern 100 of the steel wire 10 such that $L/P_0$ is 0.25 to 0.55 is suitable. When the height of the small wavy pattern is written h and the diameter of the steel wire is written d, an h/d of 1.05 to 2.00 is suitable. When the small wavy pattern is in this range, a steel cord having a balance of strength and rubber penetration at the same time can be made.

The reasons for limiting the conditions of the small wavy pattern of the steel wire 10 will now be explained.

First, when the pitch length L is made short, elongation becomes large but the breaking load falls. The shorter the lay length $P_0$ of the strands 1 is, the greater the elongation becomes, but the more the breaking load decreases due to twisting loss. For this reason, in this invention, the small wavy pattern pitch length L and the strand lay length $P_0$ are given a fixed relationship.

Making $L/P_0$ smaller than 0.25 is advantageous in that elongation increases. However, because the shape of the strand becomes nonuniform and the load does not act on each of the steel wires 10 evenly and the cord breaking load tends to fall it is not possible to make $L/P_0$ smaller than 0.25. However, when $L/P_0$ is greater than 0.55, because the steel wires 10 easily extend during twisting, the twist-in-length is inadequate and elongation of the strands 1 and the steel cord made by twisting these together also becomes low and therefore this is not suitable.

The reason for limiting the height h of the small wavy pattern 100 is that when h/d is smaller than 1.05, even if the pitch length L of the small wavy pattern 100 is suitable, elongation is insufficient, and when h/d is greater than 2.00, even if the pitch length L is suitable, a uniform load does not act on the steel wires and again elongation is insufficient.

The reason for limiting the ratio $P_1/D$ of the lay length P1 of the steel cord to the cord outer diameter D will now be explained. First, the cord outer diameter D' is obtained by the measuring method stipulated in JIS G3510. That is, using a micrometer the cord diameter is measured at three locations 100 mm apart in the axial direction of the cord and the average value of these measurements is taken.

$P_1/D$ is preferably made 8 to 15. When $P_1/D$ is less than 8, the productivity of the steel cord decreases, the twisting loss increases and the strength of the steel cord falls. However, when $P_1/D$ exceeds 15, it is difficult to make the elongation on breaking over 5% and therefore this is not suitable. By making the small wavy pattern pitch length L of the steel wires 10 such that $L/P_0$=0.25 to 0.55, making the small wavy pattern height h such that h/d=1.05 to 2.00 and making the cord lay length $P_1$ such that $P_1/D$ =8 to 15, it is possible to achieve the objects of elongation, rubber penetration and cord productivity with good balance.

The breaking load of the steel cord is preferably 1568N or more. This is adjusted by way of reduction of twisting loss, the diameter of the steel wires 10 constituting the strands or the number of steel wires used or a combination of two or more of these, or by selection of the carbon content and drawing conditions of the steel wires.

A steel cord of the invention is not limited to the structures shown in FIG. 2-A and FIG. 2-B, and also includes 3×4 structures and 6×6 structures. The invention also includes steel cords wherein these structures or the structures shown in FIG. 2-A and FIG. 2-B are used and a further steel wire of the same diameter or a different diameter to the other steel wires is topped onto outside of the steel cord.

Figure 5:
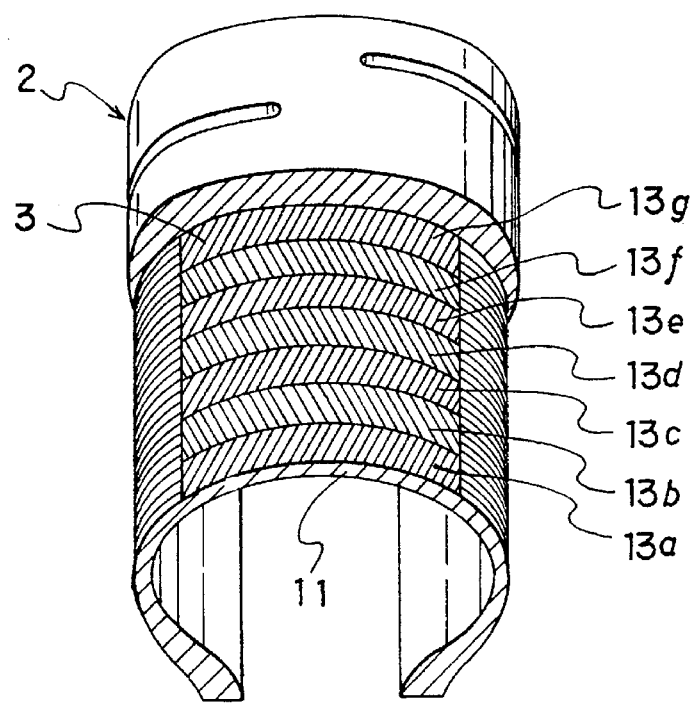
FIG. 5 is a partially cutaway plan view of super-large off-road tire to which the invention has been applied.

FIG. 5 shows a super-large off-road tire to which the invention has been applied (in this example, a radial tire). This tire 2 has a carcass 11 and a tread 12. Seven belt reinforcing layers 13a, 13b, 13c, 13d, 13e, 13f and 13g are disposed between the carcass 11 and the tread 12. Reference number 3 denotes a steel cord according to the invention. The belt reinforcing layers 13a, 13b, 13c, 13d, 13e, 13f and 13g are made by topping rubber onto steel cords 3, 3 arranged in parallel with a predetermined spacing from above and below and vulcanizing the rubber after a tire is molded. Steel cords 3 according to the invention are embedded as a reinforcing material in at least the belt reinforcing layer 13g closest to the tread 12. If necessary, they are also used in one or more belt reinforcing layers below this.

A method of manufacturing a steel cord of the invention will now be described.

FIG. 6-A and FIG. 6-B illustrate an example of manufacturing a strand 1 according to the invention using a double-twist type bunching type twisting machine. In FIG. 6-A, a bunching type twisting machine 5 has a cradle 52 and hollow shafts 51, 51' rotated by a motor 50, and bows 53, 53' which rotate integrally with the hollow shafts 51, 51' are mounted coaxially with the cradle 52. A takeup bobbin 56 and takeup capstans 55 upstream of this are provided on the cradle 52, and an over twister 54 is disposed upstream of this. A voice 6 through which pass three to six steel wires is provided on the hollow shaft 51 on an entrance side, and the same number of wire twisters 18 and performing devices 19 as there are steel wires are disposed upstream of this voice 6. The same number of supply bobbins 200 as there are steel wires are provided upstream of the performing devices 19, and steel wires 10' are led out from these supply bobbins 200, 200. Each of the wire twisters 18 comprises three rollers 180, 181 and 182 attached to a plate-shaped rotating member. Each of the preforming devices 19 comprises three to five pins 190, 191 and 192 attached in a zigzag to a plate-shaped or conical or tubular base member 194, as shown in FIG. 6-B. The pins 190, 191 and 192 may of course alternatively be attached in a straight line.

In the example shown in FIG. 6-A, the positions of the preforming devices 19 are fixed and the wire twisters 18 are revolved in the same direction as the direction of rotation of the bows 53, 53'. To obtain this revolving, power from the bunching type twisting machine 5 may be guided by way of a clutch and gearbox not shown in the drawing and the rotating bodies connected to each other by gears or the like.

To manufacture a strand 1, a necessary number of steel wires 10' (in this example, four) are pulled out from the supply bobbins 200. The steel wires 10' pass between the pins 190, 191 and 192 disposed in a zigzag of the respective preforming devices 19, are then led to the wire twisters 18, guided by the entrance side roller 180 of the respective wire twister 18 and led to the middler roller 181, wound around this and guided to the output side roller 182. They are then brought together by the voice 6, pass through the hollow shaft 51 and from a guide roller 57 pass around the bow 53, from a guide roller 58 are led through the hollow shaft 51' to the over twister 54 and are led by way of the capstan 55 to the takeup bobbin 56.

In this state the hollow shafts 51, 51' are driven and the bows 53, 53' are rotated, and the wire twisters 18 are revolved at a predetermined ration with respect to this. Because each of the wire twisters 18 autorotates about the line on which the steel wire passes through it, the steel wires 10', 10' are given a continuous helical small wavy pattern 100 as a result of passing between the pins 190, 191 and 192 of the preforming devices 19. In this state the steel wires 10, 10 provided with the small wavy pattern are sent to the voice 6 and bundled.

The steel wires 10, 10 having been given the small wavy pattern are simultaneously given a first twist in the course of passing from the hollow shaft 51 to the guide roller 57 and are given a second twist in the course of passing from the guide roller 58 to the hollow shaft 51' and become a strand 1, the twisting is ordered by the over twister 54 and the strand 1 is taken up by the takeup bobbin 56. Three to six strands 1 obtained in this way are simultaneously twisted together in the same direction and with the same lay length by another twisting machine. Thus a steel cord according to the invention is obtained. At this time it is possible to use a tube type twisting machine as the twisting machine, but a bunching type twisting machine gives higher productivity and is advantageous in terms of cost.

The manufacturing method described above is an example, and other methods may also be used. For example, although in the manufacturing method described above the preforming devices 19 are fixed and the wire twisters 18 rotate in the same direction as the direction of ration as the cradle, instead of this the wire twisters 18 may be dispensed with and the preforming devices 19 only used and the preforming devices 19 rotated about the respective steel wire axes in the opposite direction to the bows 53, 53'. Also, it is possible to manufacture the strands with a tube type twisting machine.

Furthermore, although the small wavy pattern 100 of the steel wires 10 generally is preferably helical, in some cases it may alternatively be a two-dimensional wave. In this case, a pair of gears can be used as the preforming device 19 and the steel wire passed between the gears.

EXAMPLE

1) Steel cords of the invention were actually made, and their characteristics are shown together with those of comparison examples in Table 1 and Table 2. Samples 1 and 2 and 7 to 9 are examples of the invention, and Samples 3 to 5 and 10 and 11 are comparison examples.

For comparison, using steel wires of the same diameter as in the invention, a conventional steel cord of 4×4 structure was made. This is Sample 5. The small wavy pattern of the steel wires in the invention was made helical.

2) Table 1 shows characteristics of steel cords of 4×4 structure made using brass-plated steel wires of diameter 0.35 mm (tensile strength=2626N/mm$^2$), and Table 2 shows characteristics of steel cords of 3×5 structure made using brass-plated steel wires of diameter 0.38 mm (tensile strength=2773N/mm$^2$).

TABLE 1

|   |   | Sample 1 | Sample 2 | Sample 3 | Sample 4 | Sample 5 | Sample 6 |
|---|---|---|---|---|---|---|---|
| A | Twisting Pitch Po (mm) | 8.57 | 12.16 | 12.70 | 8.31 | 8.52 | 4.22 |
|   | Small Wave Pitch (L/Po) | 0.35 | 0.41 | 0.23 | 0.60 | 0.59 |  |
|   | Small Wave Height (h/d) | 1.73 | 1.58 | 1.95 | 1.20 | 1.03 |  |
| B | Cord Diameter D (mm) | 2.04 | 2.01 | 1.99 | 2.06 | 2.05 | 2.14 |
|   | Twisting Pitch $P_1$ (mm) | 20.9 | 25.4 | 30.5 | 20.7 | 20.9 | 10.0 |
|   | Pitch Multiple $P_1/D$ | 10.3 | 12.6 | 15.3 | 10.1 | 10.2 | 4.7 |
|   | Breaking Load (N) | 3587 | 3753 | 3058 | 3567 | 3577 | 2842 |
|   | Twisting Efficiency (%) | 88.7 | 92.8 | 75.6 | 88.2 | 88.5 | 70.3 |
|   | Elongation on Breaking (%) | 6.03 | 5.42 | 4.88 | 4.63 | 4.45 | 7.61 |
|   | Rubber Penetration 1 (%) | 90 | (0 | 95 | 90 | 70 | 90 |

Note:
A are strands, B are steel cords

TABLE 2

|   |   | Sample 7 | Sample 8 | Sample 9 | Sample 10 | Sample 11 |
|---|---|---|---|---|---|---|
| A | Twisting Pitch Po (mm) | 12.68 | 12.51 | 12.03 | 14.52 | 11.96 |
|   | Small Wave Pitch (L/Po) | 0.36 | 0.36 | 0.37 | 0.31 | 0.38 |
|   | Small Wave Height (h/d) | 1.45 | 1.62 | 1.91 | 1.90 | 2.18 |
| B | Cord Diameter D (mm) | 2.24 | 2.16 | 2.15 | 2.12 | 2.14 |
|   | Twisting Pitch $P_1$ (mm) | 19.8 | 24.6 | 29.8 | 34.7 | 29.6 |
|   | Pitch Multiple $P_1/D$ | 8.84 | 11.4 | 13.9 | 16.4 | 13.8 |
|   | Breaking Load (N) | 4263 | 4332 | 4371 | 4430 | 4077 |
|   | Twisting Efficiency (%) | 90.4 | 91.8 | 92.6 | 93.9 | 86.4 |
|   | Elongation on Breaking (%) | 6.34 | 7.10 | 5.38 | 4.71 | 4.37 |
|   | Rubber Penetration (%) | 90 | 90 | 95 | 90 | 95 |

Note:
A are strands, B are steel cords

In Table 1 and Table 2, 'Twisting Efficiency' is [cord strength/(steel wire strength before twisting × number of constituent steel wires)]×100%.

'Strand Twisting Pitch' is the pitch length in the steel cord state.

'Small Wave Pitch, Small Wave Height' are values measured for a steel wire removed from a steel cord.

'Rubber Penetration' is the degree of rubber penetration into inside a cord visually observed when a steel cord was vulcanized under a tension of 100 g in rubber and then the steel cord was removed and split into two in the length direction, and is expressed as a percentage of area covered by rubber.

'Elongation of Breaking' was measured according to ASTM.

3) As is clear from Table 1, in Samples 1 and 2, which are embodiments of the invention, because the relationship between the pitch length and the wave height of the small wavy pattern of the steel wires constituting the strands and the strand lay length is suitable and the relationship between the cord lay length and the cord diameter is also correct, the elongation on breaking is large and furthermore the breaking load is high and the rubber penetration is also good.

In Sample 3, on the other hand, which is a comparison example, because the pitch length of the small wavy pattern is short and the relationship between the cord lay length and the cord diameter is not correct either, the breaking load, the twisting efficiency and the elongation on breaking are inferior. On the comparison example of Sample 4, because the pitch length of the small wavy pattern is too long, the elongation on breaking is inferior. In the comparison example of Sample 5, because the pitch length and the wave height of the small wavy pattern are not correct, the elongation on breaking and the rubber penetration are inferior. In Sample 6, which is conventional example, the breaking load and the twisting efficiency are very poor.

As is clear from Table 2, in Samples 7, 8 and 9, which are embodiments of the invention, the elongation on breaking is large and furthermore the breaking load is high and the rubber penetration is also good. In Sample 10, on the other hand, because the relationship between the cord lay length and the cord diameter is not suitable, the elongation on breaking is poor. In sample 11, which is a comparison example, because the height of the small wavy pattern is not suitable the breaking load, the twisting efficiency and the elongation on breaking are inferior.

It will be understood that each of the elements described above, or two or more together, may also find a useful application in other types of constructions differing from the types described above.

While the invention has been illustrated and described as embodied in steel cord for reinforcement of off-road tire, method of manufacturing the same, and off-road tire, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A steel cord for reinforcement of an off-road tire, comprising a plurality of strands each including three-six steel wires twisted together in a same twisting direction and with a same pitch length, each of said steel wires having a wavy pattern of a pitch length smaller than a lay length of said strands, each of said strands having a pattern in which a wavy pattern formed by the twisting and said wavy pattern of said steel wires are compounded and gaps are formed between said steel wires by said wavy patterns of said steel wires, three-six of said strands being simultaneously twisted together in a same twisting direction as a strand twisting direction and with a same pitch to form the steel cord, a lay length P1 of the steel cord being 8–15 times diameter D of the steel cord and an elongation of breakage by tension of the steel cord being over 5%.

2. A steel cord as defined in claim 1, wherein said wavy pattern of said steel wires is helical and the pitch length and its height satisfy the following expressions:

$$0.25 \leq L/P_0 \leq 0.55$$

$$1.05 \leq h/d \leq 2.00$$

wherein L is a pitch length of the wavy pattern of the steel wires in mm; $P_0$ is a strand lay length in mm; h is a height of the wavy pattern of the steel wires in mm; and d is a steel wire diameter.

3. A steel cord as defined in claim 1, wherein said wavy pattern of said steel wires is two-dimensional and the pitch length and its height satisfy the following expressions:

$$0.25 \leq L/P_0 \leq 0.55$$

$$1.05 \leq h/d \leq 2.00$$

wherein L is a pitch length of the wavy pattern of the steel wires in mm; $P_0$ is a strand lay length in mm; h is a height of the wavy pattern of the steel wires in mm; and d is a steel wire diameter.

4. A steel cord as defined in claim 1, wherein the steel cord has a breaking load of over 1568N.

* * * * *